March 22, 1927. 1,622,240
E. J. STAHL
VEHICLE
Filed Dec. 5, 1925 3 Sheets-Sheet 1
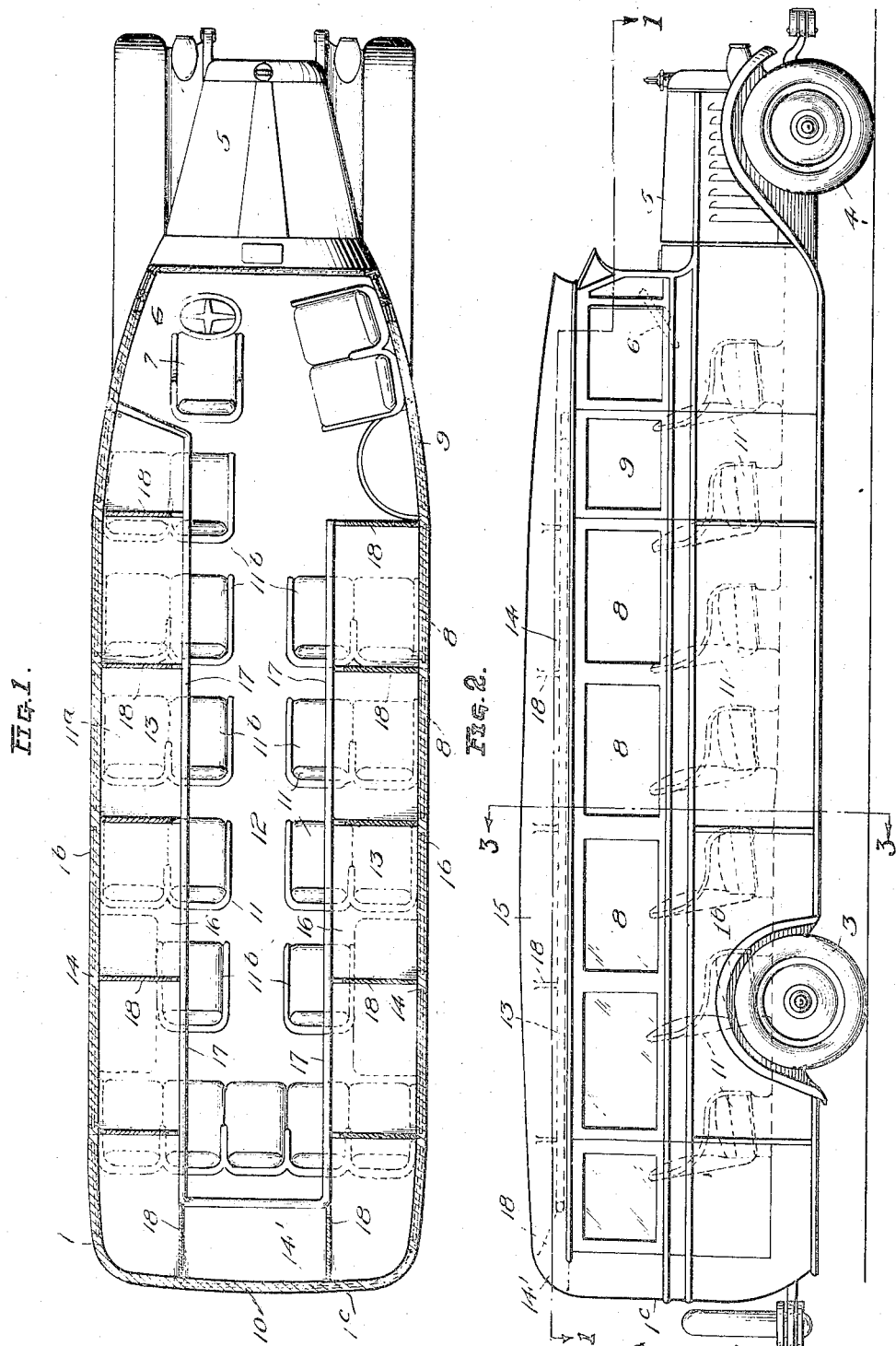

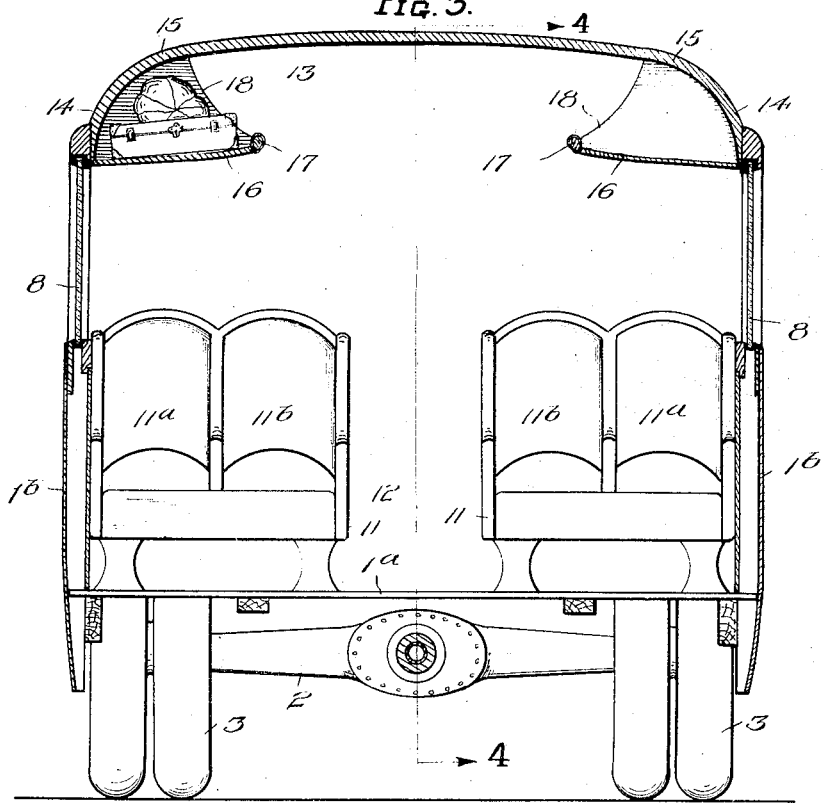
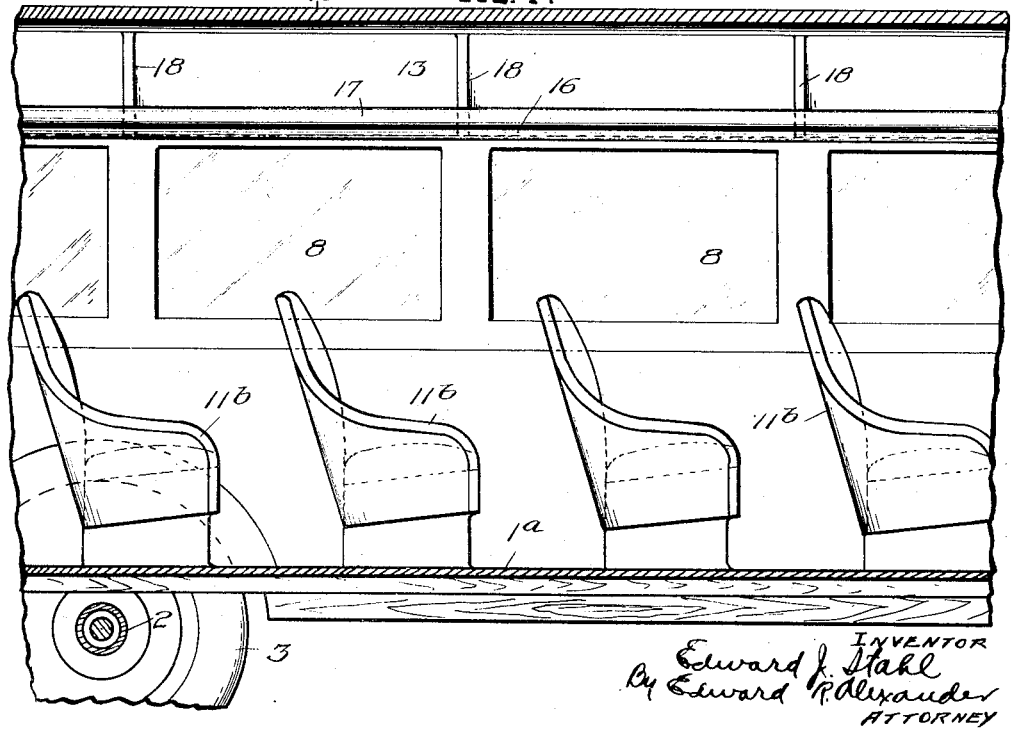

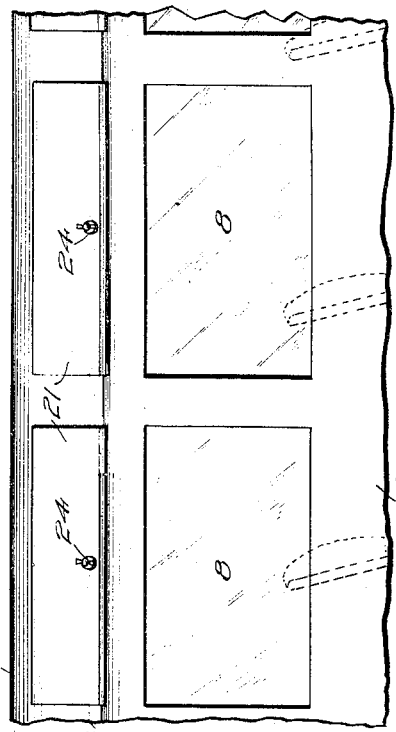
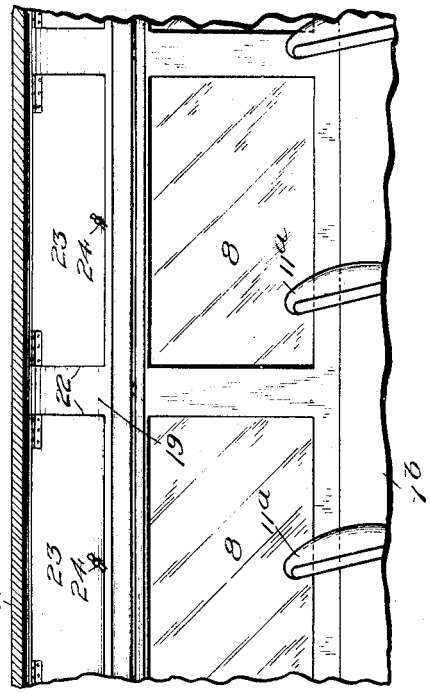
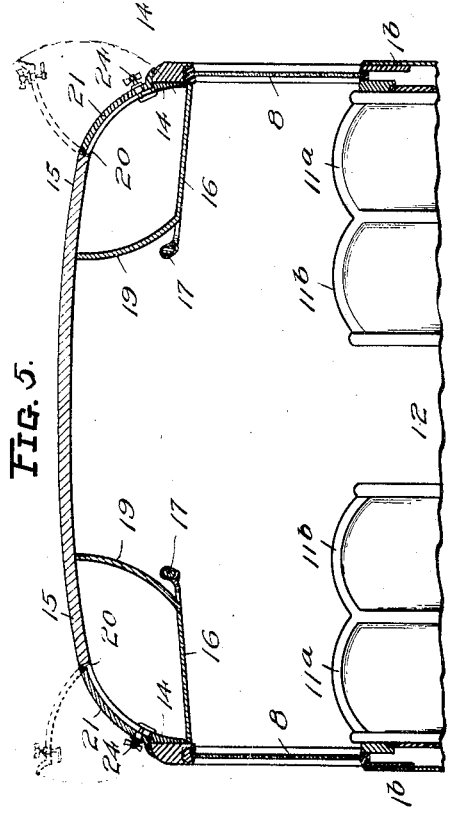
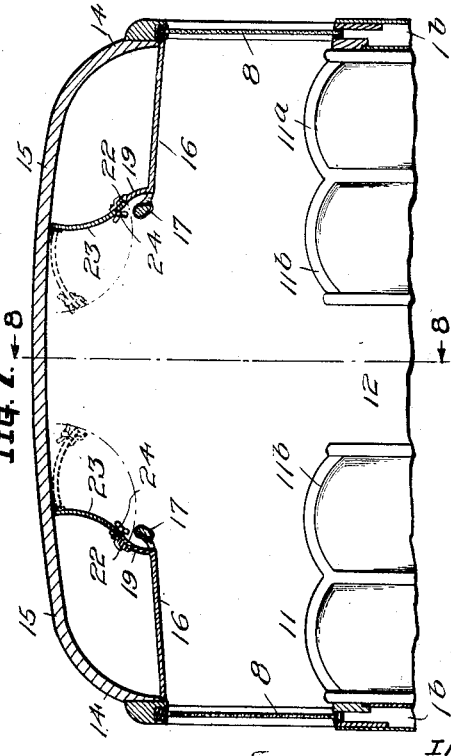

Patented Mar. 22, 1927.

1,622,240

UNITED STATES PATENT OFFICE.

EDWARD J. STAHL, OF CLEVELAND, OHIO, ASSIGNOR TO THE BAKER-RAULANG COMPANY, OF CLEVELAND, OHIO, A CORPORATION OF OHIO.

VEHICLE.

Application filed December 5, 1925. Serial No. 73,433.

This invention relates to a vehicle, for example, a vehicle of the enclosed type capable of carrying a number of passengers, more particularly where such passengers have luggage and packages necessary for the trip that they are making in the vehicle.

One object of the invention is to provide a vehicle of this type of an improved construction capable of receiving and holding luggage, whereby larger seating capacity results, seating is facilitated and movement into, through and from the vehicle is unobstructed both for the passengers and the luggage and packages which they may carry.

Another object of the invention is to construct a vehicle of this type in which provision is made for storing luggage for each passenger convenient to his seat and substantially independent of other luggage, whereby ready storing and accessibility result.

Another object of the invention is to provide an improved vehicle of this type wherein ample head room space and luggage storing space are provided for and greater seating capacity results.

Another object of the invention is to provide an improved vehicle of this character having a luggage loft permitting of ample space for storing luggage with ready access thereto.

Other objects of the invention will be apparent to those skilled in the art to which my invention relates from the following description taken in connection with the accompanying drawings wherein—

Fig. 1 is a longitudinal section of vehicle embodying my invention, said section being taken on the line 1—1 of Fig. 2.

Fig. 2 is a side elevation of the vehicle.

Fig. 3 is a section on the line 3—3 of Fig. 2.

Fig. 4 is a fragmentary section on the line 4—4 of Fig. 3.

Fig. 5 is a fragmentary transverse section of the vehicle body, but showing a slightly different form of construction.

Fig. 6 is a side elevation of the parts shown in Fig. 5.

Fig. 7 is a fragmentary transverse section of the vehicle body, but showing another form of construction.

Fig. 8 is a section on the line 8—8 of Fig. 7.

In the drawings, 1 indicates a vehicle body comprising a suitable flooring 1ª, side walls 1ᵇ and end wall 1ᶜ. The body 1 is mounted on a frame (not shown) which in turn is connected in the usual manner by suitable springs to the axle 2 for rear wheels 3 and to the axle for the front wheels 4, the rear wheels 3 preferably being of the twin type— see Fig. 3. The wheels 3 are driven by the usual mechanism, which includes a motor disposed below the hood 5; and the wheels 4 may be steered by a wheel 6 arranged adjacent to the driver's seat 7. The mechanisms for driving, steering and operating the vehicle and the necessary accessories therefor are not shown since the same, in themselves, form no part of the present invention, it being understood that they may be of any desired construction and type.

The side walls of the vehicle may be constructed to provide a plurality of windows such as shown herein, or a plurality of doors; in the preferred form of construction the side walls 1ᵇ are provided with sliding windows 8, a hinged door 9 and an emergency door 10, the latter being provided in the end wall 1ᶜ.

11 indicates the seats for the passengers, preferably arranged transversely and disposed in pairs (except those at the rear end of the body and a pair of seats disposed forwardly of the door 9) so as to form between them an aisle 12 extending centrally of the body, to provide outer seats 11ª adjacent the side walls 1ᵇ and inner or aisle seats 11ᵇ adjacent the aisle. The seats may be of any desired construction.

13 indicates a loft for luggage extending longitudinally of the body 1 from end to end thereof and removably supported along its sides upon the upper ends of the side walls 1ᵇ. As more clearly shown in Fig. 3, the loft 3 comprises side members 14, an end section 14' and a top 15, these walls being preferably of curvilinear shape in cross section and connected to enhance the appearance of the body 1 in beauty and symmetry, as well as to insure drainage of water. 16 indicates a support extending inwardly from each side member 14 in spaced relation to the top 15 and substantially parallel thereto to form a receiving space and support for luggage. The inner portions of the supports 16 preferably curve upwardly, this arrangement serving to incline the articles and bodies stored on the supports outwardly and also effecting outward movement thereof due to the jarring of the vehicle to avoid danger of the articles or bodies being thrown over the edges of the supports and downwardly in the aisle or on any of the passengers. As shown in Figs. 1 and 3, the supports 16 extend inwardly beyond the outer seats of each pair, but terminate at a point within the inner side edges of the inner seats of each pair, thereby permitting the passenger to readily position himself in front of an inner seat and sit down without contacting with the support 16, since the arrangement just described affords ample head room for the passenger when moving from the aisle and taking one of the inner seats; whereas a passenger sitting in an inner seat can rise upwardly a convenient distance and move laterally into the adjacent outer seat without danger of engaging the support 16. The supports 16 extend along either side member 14 and the end section 14', preferably terminating on one side rearwardly of the driver's seat 7 and on the other side at the door 9. 17 indicates a bar extending continuously along the inner or free end of the support and extending upwardly therefrom, whereby it may serve as an abutment wall to prevent the luggage from sliding off of the support 16 and also as a gripping rail for passengers while standing in or moving through the aisle. For this latter purpose the bar may be rounded and to avoid damage to the luggage it may be covered with plush or other suitable material. 18 indicates partitions disposed transversely and at spaced positions along the supports 16, serving to divide the space between the latter and the top 15 into individual compartments so that danger of the luggage sliding endwise of the support or the luggage of one passenger getting mixed with that of another passenger is avoided, thereby enabling each passenger to feel secure in the safety of the luggage stored in the loft. The partitions 18 are secured to the top 15 and supports 16 by suitable means, such as screws, whereby the latter are held against flexing and amply supported along their free or inner edges to support the luggage stored thereon.

In the vehicles of this type in use today, it is customary (1) for each passenger to carry his luggage with him and crowd it between his seat and the next forward seat or to leave it in the aisle 12, (2) to place it on top of the vehicle where it is liable to damage or of being lost, or (3) for the driver to store all of the luggage at the rear end of the vehicle on the floor 1ª and rearmost seats, thereby obstructing the passage and space leading to the emergency door. Aside from this latter objection, each passenger is confronted with the danger of someone taking his luggage when leaving.

In my construction, all of these objections are eliminated, seating is facilitated, obstructions to the feet of the passengers while seated are avoided, the aisle 12 is maintained clear for movement therethrough or for standing purposes, each passenger has supervision of and access to his own luggage, the responsibility and extra labor for the driver is lessened or entirely done away with and full seating and standing capacity is insured, both for the convenience of the passengers and for the profitable operation of the vehicle.

The loft 13 is constructed so that its side and end members 14, 14', extend upwardly from the side and end walls 1ᵇ, 1ᶜ, being a continuation of the latter and forming therewith the sides of the vehicle, and the top extends across and connects these sides to form a roof for the vehicle. This construction not only provides sufficient space for the luggage but affords ample head room between the luggage storing spaces, not only for the passengers when standing but while placing luggage on the supports 16 or removing it therefrom.

Where the side and end members 14, 14', are formed separate from the walls 1ᵇ, 1ᶜ, as shown in the drawings, they may be removably connected to the latter so that the members 14, 14', may be raised and removed and a roof (not shown) placed on the side and end walls to provide a vehicle of the ordinary type when desired.

In Figs. 5 to 8, inclusive, I have shown a slightly different form of construction, by providing between the inner end of each support 16 and the top 15 a wall 19 which co-operates with the adjacent side member to close the storing or luggage space. As shown in Figs. 5 and 6 the side member 14 is formed with a plurality of openings 20, each closed by a door 21, preferably hinged along its upper edge whereby it may be raised (see dotted lines in Fig. 5) to permit positioning of the luggage on the support 16 or its removal therefrom; while in Figs. 7 and 8 I have shown a slightly different form in which openings 22 are formed in the wall 19 and each closed by a door 23. The doors 23 are preferably hinged along their upper edges.

Each of the doors 21 and 23 may be provided with suitable locks 24 and provision may be made for holding them in open position while access to the storing space takes place.

In the use of the term luggage herein I have in mind suit cases, hand bags and other forms of containers, as well as packages, wraps and other articles which a passenger may find it desirable to carry, and also other articles, packages and the like that may be received for transportation or shipment from one place to another.

To those skilled in the art to which my invention relates, many changes in construction and widely differing embodiments and applications of my invention will suggest themselves without departing from the spirit and scope thereof. My disclosures and the description herein are purely illustrative and are not intended to be in any sense limiting.

What I claim is:

1. A closed vehicle for passengers and luggage comprising a body having a flooring, sides and a substantially flat roof forming a top for the body, seats on and covering a major portion of said flooring, said seats being correlated to form a central aisle on said flooring extending throughout a greater portion thereof, substantially continuous, horizontal walls, disposed in spaced relation to said top and each connected along its outer edge to the adjacent body side and extending inwardly therefrom to form a support and storing space for luggage, and a continuous, unobstructed bar carried on the inner longitudinal edge of each said supporting wall and forming a combined gripping and guiding rail and an abutment to prevent displacement of luggage on said support, said supporting walls extending inwardly over said seats and in relation to said aisle, whereby the bars carried thereby are designedly positioned for gripping by the passengers standing or moving through said aisle and permitting head room between the storing spaces.

2. A closed vehicle for passengers and luggage comprising in combination, a body having flooring, sides and a substantially flat roof forming a top for the body and at a sufficient height from said flooring to permit a passenger to stand upright, seats on said flooring, said seats being correlated to form a central aisle on said flooring, substantially continuous horizontal supporting walls disposed in spaced relation to said top and each extending inwardly from the adjacent body side to form a storage space, and a continuous, unobstructed bar carried on the inner longitudinal edge of each of said supporting walls designedly spaced at such a height from the floor to permit visual inspection over said bar of said storing space by a passenger, said bar forming a combined gripping rail and abutment to prevent displacement of the luggage on said support.

In testimony whereof, I have hereunto subscribed my name.

EDWARD J. STAHL.